United States Patent
Oshiro (10) Patent No.: US 7,912,604 B2
(45) Date of Patent: Mar. 22, 2011

(54) METHOD, APPARATUS AND PROGRAM FOR ALARMING ABNORMALITY IN TIRE AIR-PRESSURE

(75) Inventor: Yuji Oshiro, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 935 days.

(21) Appl. No.: 11/819,979

(22) Filed: Jun. 29, 2007

(65) Prior Publication Data
US 2008/0021610 A1    Jan. 24, 2008

(30) Foreign Application Priority Data
Jul. 20, 2006  (JP) ................. 2006-197723

(51) Int. Cl.
*B60G 17/018* (2006.01)
(52) U.S. Cl. ........................... 701/37; 701/31
(58) Field of Classification Search .................. 701/29, 701/31, 36, 37; 340/442–449; 73/146–146.5
See application file for complete search history.

(56) References Cited

U.S. PATENT DOCUMENTS

| | | | | |
|---|---|---|---|---|
| 5,374,077 A | * | 12/1994 | Penzotti et al. | 280/683 |
| 7,139,649 B2 | * | 11/2006 | Heer | 701/37 |
| 7,233,238 B2 | * | 6/2007 | Suzuki et al. | 340/444 |
| 2006/0064238 A1 | | 3/2006 | Kitano | |

FOREIGN PATENT DOCUMENTS

| | | |
|---|---|---|
| JP | 1-141106 A | 6/1989 |
| JP | 2003-54230 A | 2/2003 |
| JP | 2006-84424 A | 3/2006 |

* cited by examiner

*Primary Examiner* — Richard M. Camby
(74) *Attorney, Agent, or Firm* — Birch, Stewart, Kolasch & Birch, LLP (57) ABSTRACT

It is the purpose of the present invention to provide a method, apparatus and program for alarming abnormality in tire air-pressure capable of precisely detecting decrease in tire air-pressure even at actuation of air suspension in a vehicle equipped with air suspensions.
The present invention discloses a method for alarming abnormality in tire air-pressure informing decrease in tire air-pressure mounted on a vehicle, comprising a step of judging whether loads applied on respective tires are changed by the influence of air suspensions based on the difference of the heights of strokes between left wheel and right wheel in a vehicle equipped with the air suspensions and affect the rotational wheel speeds of tires or not, and increasing threshold for carrying out the judgment of decrease in tire air-pressure when the air suspensions provide influence.

9 Claims, 7 Drawing Sheets

FIG. 7

METHOD, APPARATUS AND PROGRAM FOR ALARMING ABNORMALITY IN TIRE AIR-PRESSURE

BACKGROUND OF THE INVENTION

The present invention relates to a method, apparatus and program for alarming abnormality in tire air-pressure.

Conventionally, a method for alarming abnormality in tire air-pressure that detects decrease in tire air-pressure and generates alarm detects whether tire air-pressure is decreased or not by the variation of judgment value (DEL) calculated, for example by the equation (1) from the rotational speeds of respective tires utilizing that the rotational speed of a decreased tire is faster in comparison with the rotational speeds of tires with normal air-pressure and generate alarm when decrease in tire air-pressure is detected. Further, in the equation (1), FL shows the speed of a front left wheel, FR shows the speed of a front right wheel, RL shows the speed of a rear left wheel and RR shows the speed of a rear right wheel.

$$DEL=((FL+RR)/(FR+RL)-1)\times 100 \qquad (1)$$

In the method, there are known methods such as, for example, a method of providing difference between threshold for judging the deflation of driven wheels and threshold for judging the deflation of drive wheels (refer to Japanese Unexamined Patent Publication No. 2003-54230).

However, when air suspensions are actuated in a vehicle equipped with air suspensions and the heights of strokes are different in left and right sides, loads applied on respective left and right tires are changed. Further, the dynamic load radius of a tire differs depending on load applied on the tire, and the larger the load applied on a tire is, the faster the rotational speed is.

Accordingly, for example, when the air suspensions are actuated, it cannot be judged whether it is caused by decrease in tire air-pressure or by the actuation of an air suspension when the rotational speed of a tire of one wheel increases, therefore there has been a problem that it causes erroneous report and no alarm.

SUMMARY OF THE INVENTION

It is the purpose of the present invention to provide a method, apparatus and program for alarming abnormality in tire air-pressure informing decrease in tire air-pressure mounted on a vehicle, capable of precisely detecting decrease in tire air-pressure even at actuation of air suspension in a vehicle equipped with air suspensions.

The present invention relates to a method for alarming abnormality in tire air-pressure informing decrease in tire air-pressure mounted on a vehicle, comprising a step of judging whether loads applied on respective tires are changed by the influence of air suspensions based on the difference of the heights of strokes between left wheel and right wheel in the vehicle equipped with the air suspensions and affect the rotational wheel speeds of tires or not, and not carrying out the judgment of decrease in tire air-pressure when the air suspensions provide influence.

The present invention relates to a method for alarming abnormality in tire air-pressure informing decrease in tire air-pressure mounted on a vehicle, comprising a step of judging whether loads applied on respective tires are changed by the influence of air suspensions based on the difference of the heights of strokes between left wheel and right wheel in the vehicle equipped with air suspensions and affect the rotational wheel speeds of tires or not, and increasing threshold for carrying out the judgment of decrease in tire air-pressure when the air suspensions provide influence.

The present invention relates to a method for alarming abnormality in tire air-pressure informing decrease in tire air-pressure mounted on a vehicle, comprising a step of judging whether loads applied on respective tires are changed by the influence of air suspensions based on the difference of the heights of strokes between left wheel and right wheel in a vehicle equipped with the air suspensions and affect the rotational wheel speeds of tires or not, and correcting a judgment value for carrying out the judgment of decrease in tire air-pressure when the air suspensions provide influence.

Further, the present invention relates to an apparatus for alarming abnormality in tire air-pressure informing decrease in tire air-pressure mounted on a vehicle, comprising means of judging whether loads applied on respective tires are changed by the influence of air suspensions based on the difference of the heights of strokes between left wheel and right wheel in the vehicle equipped with the air suspensions and affect the rotational wheel speeds of tires or not, and not carrying out the judgment of decrease in tire air-pressure when the air suspensions provide influence.

The present invention relates to an apparatus for alarming abnormality in tire air-pressure informing decrease in tire air-pressure mounted on a vehicle, comprising means of judging whether loads applied on respective tires are changed by the influence of air suspensions based on the difference of the heights of strokes between left wheel and right wheel in the vehicle equipped with air suspensions and affect the rotational wheel speeds of tires or not, and increasing threshold for carrying out the judgment of decrease in tire air-pressure when the air suspensions provide influence.

The present invention relates to an apparatus for alarming abnormality in tire air-pressure informing decrease in tire air-pressure mounted on a vehicle, comprising means of judging whether loads applied on respective tires are changed by the influence of air suspensions based on the difference of the heights of strokes between left wheel and right wheel in a vehicle equipped with air suspensions and affect the rotational wheel speeds of tires or not, and correcting a judgment value for carrying out the judgment of decrease in tire air-pressure when the air suspensions provide influence.

The present invention relates to a program for alarming abnormality in tire air-pressure informing decrease in tire air-pressure mounted on a vehicle, for making a computer execute a procedure of judging whether loads applied on respective tires are changed by the influence of air suspensions based on the difference of the heights of strokes between left wheel and right wheel in the vehicle equipped with air suspensions and affect the rotational wheel speeds of tires or not, and not carrying out the judgment of decrease in tire air-pressure when the air suspensions provide influence.

The present invention relates to a program for alarming abnormality in tire air-pressure informing decrease in tire air-pressure mounted on a vehicle, for making a computer execute a procedure of judging whether loads applied on respective tires are changed by the influence of air suspensions based on the difference of the heights of strokes between left wheel and right wheel in the vehicle equipped with air suspensions and affect the rotational wheel speeds of tires or not, and increasing threshold for carrying out the judgment of decrease in tire air-pressure when the air suspensions provide influence.

The present invention relates to a program for alarming abnormality in tire air-pressure informing decrease in tire air-pressure mounted on a vehicle, for making a computer execute a procedure of judging whether loads applied on respective tires are changed by the influence of air suspensions based on the difference of the heights of strokes between left wheel and right wheel in a vehicle equipped with air suspensions and affect the rotational wheel speeds of tires or not, and correcting a judgment value for carrying out the judgment of decrease in tire air-pressure when the air suspensions provide influence.

According to the present invention, there can be provided a method, apparatus and program for alarming abnormality in tire air-pressure, capable of judging whether loads applied on respective tires are changed by the influence of air suspensions based on the difference of the heights of strokes between left wheel and right wheel in a vehicle equipped with air suspensions and affect the rotational wheel speeds of tires or not, and capable of precisely detecting decrease in tire air-pressure by changing the judgment means of decrease in tire air-pressure even if air suspensions are actuated in a vehicle equipped with air suspensions, loads applied on respective tires are changed by the influence of air suspensions and the rotational, wheel speeds of tires are affected.

DETAILED DESCRIPTION

Figure 1:
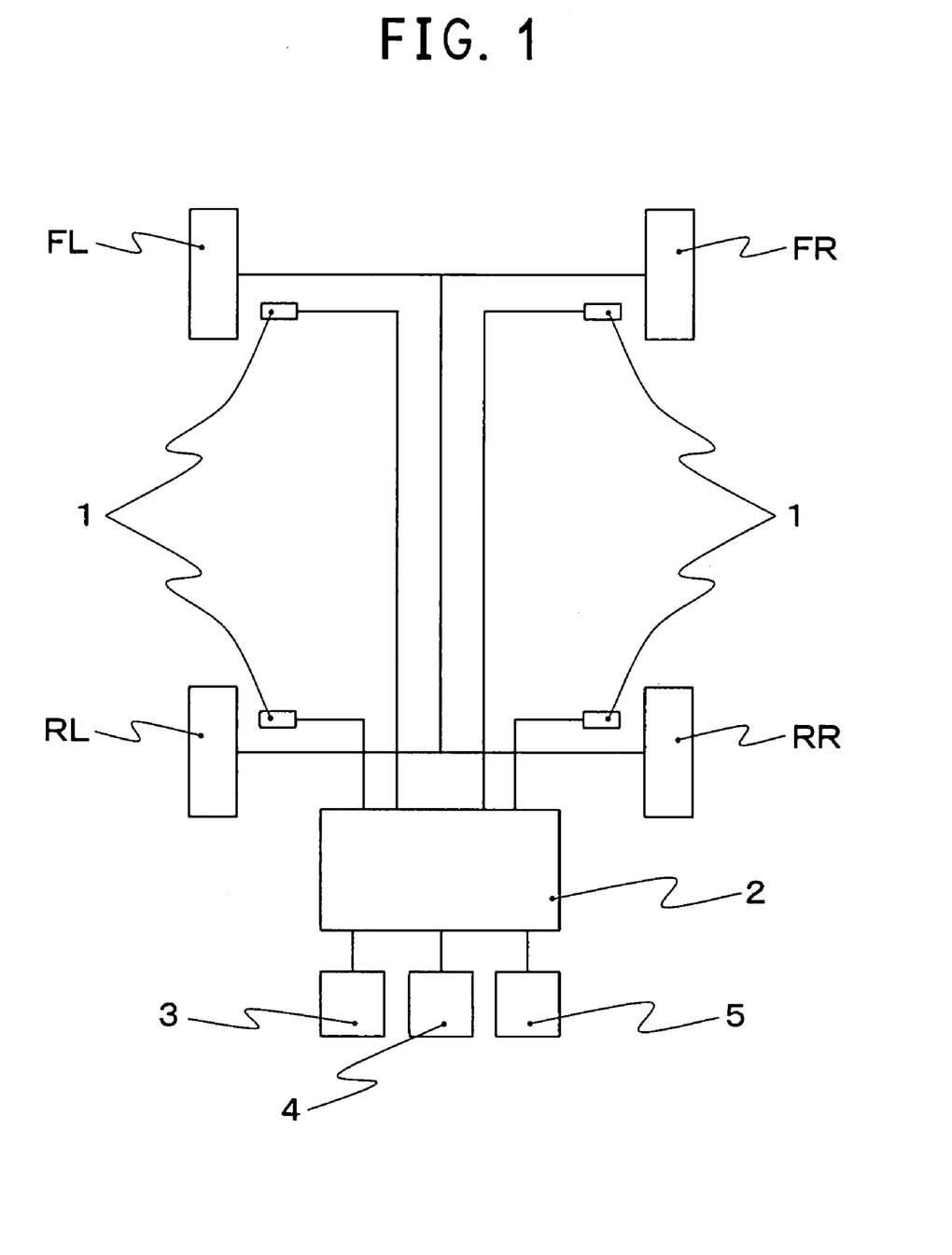
FIG. 1 is a block diagram showing one Embodiment of an apparatus for alarming abnormality in tire air-pressure according to the present invention.
Figure 2:
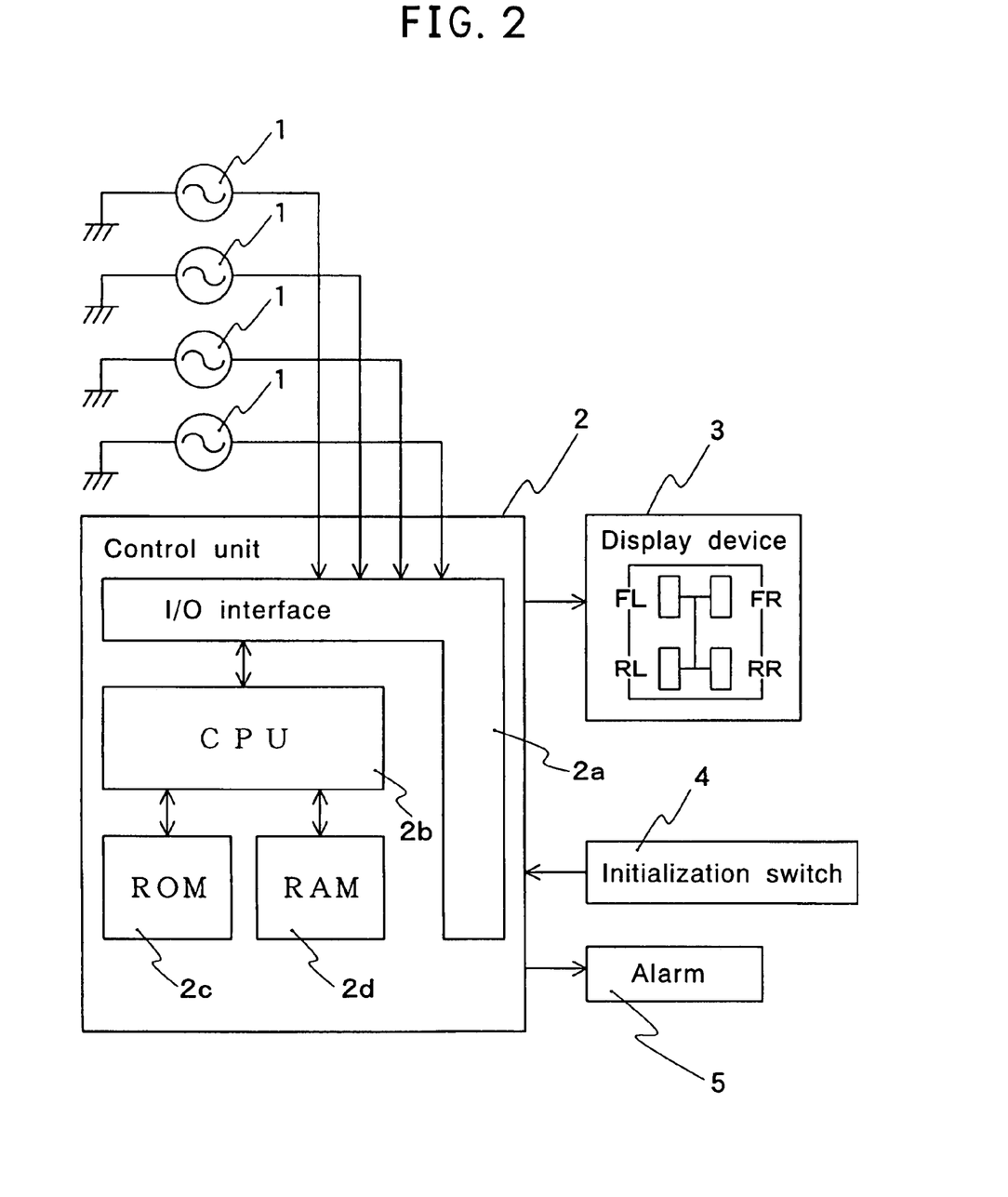
FIG. 2 is a block diagram showing an electrical configuration of an apparatus for alarming abnormality in tire air-pressure illustrated in FIG. 1.

The method, apparatus and program for alarming abnormality in tire air-pressure according to the present invention will now be explained with reference to the accompanying drawings. FIG. 1 is a block diagram showing one Embodiment of an apparatus for abnormality in tire air-pressure according to the present invention. FIG. 2 is a block diagram showing an electrical configuration of an apparatus for abnormality in tire air-pressure illustrated in FIG. 1.

As shown in FIG. 1, the apparatus for alarming decrease in tire air-pressure related to the embodiment of the present invention detects whether each air-pressure of 4 tires of FL, FR, RL and RR is decreased or not and is equipped with an usual the rotational wheel speed detecting means 1 provided relative to respective tires.

As the rotational wheel speed detecting means 1, there can be used a wheel speed sensor for generating rotational pulse using an electromagnetic pick-up or similar and measuring rotational angular velocities and wheel speeds based on the number of pulse, or an angular velocity sensor in which power is generated by using rotation such as in a dynamo, wherein rotational angular velocities and wheel speed are measured from a voltage. The output of the above-mentioned rotational wheel speed detecting means 1 is provided for a control unit 2 that is a computer for ABS. The control unit 2 is connected to a display unit 3 composed of a liquid crystal display device, a plasma display device or a CRT for informing whose tire air-pressure is decreased, an initialization switch 4 capable of being operated by a driver and alarm 5.

As shown in FIG. 2, the control unit 2 is composed of an I/O interface 2a necessary for transmission and receipt of signals with an external apparatus, CPU 2b functioning as the center of processing, ROM 2c in which the control operation program of the CPU 2b is stored and RAM 2d in which data are temporarily written when the CPU 2b carries out control operation and data written are read, etc.

The method for alarming abnormality in tire air-pressure in the first mode of the present invention includes a step (hereinafter, referred to as Step A) of judging whether loads applied on respective tires are changed by the influence of air suspensions based on the difference of the heights of strokes between left wheel and right wheel in the vehicle equipped with air suspensions and affect the rotational wheel speeds of tires or not, and not carrying out the judgment of decrease in tire air-pressure when the air suspensions provide influence.

Figure 3:
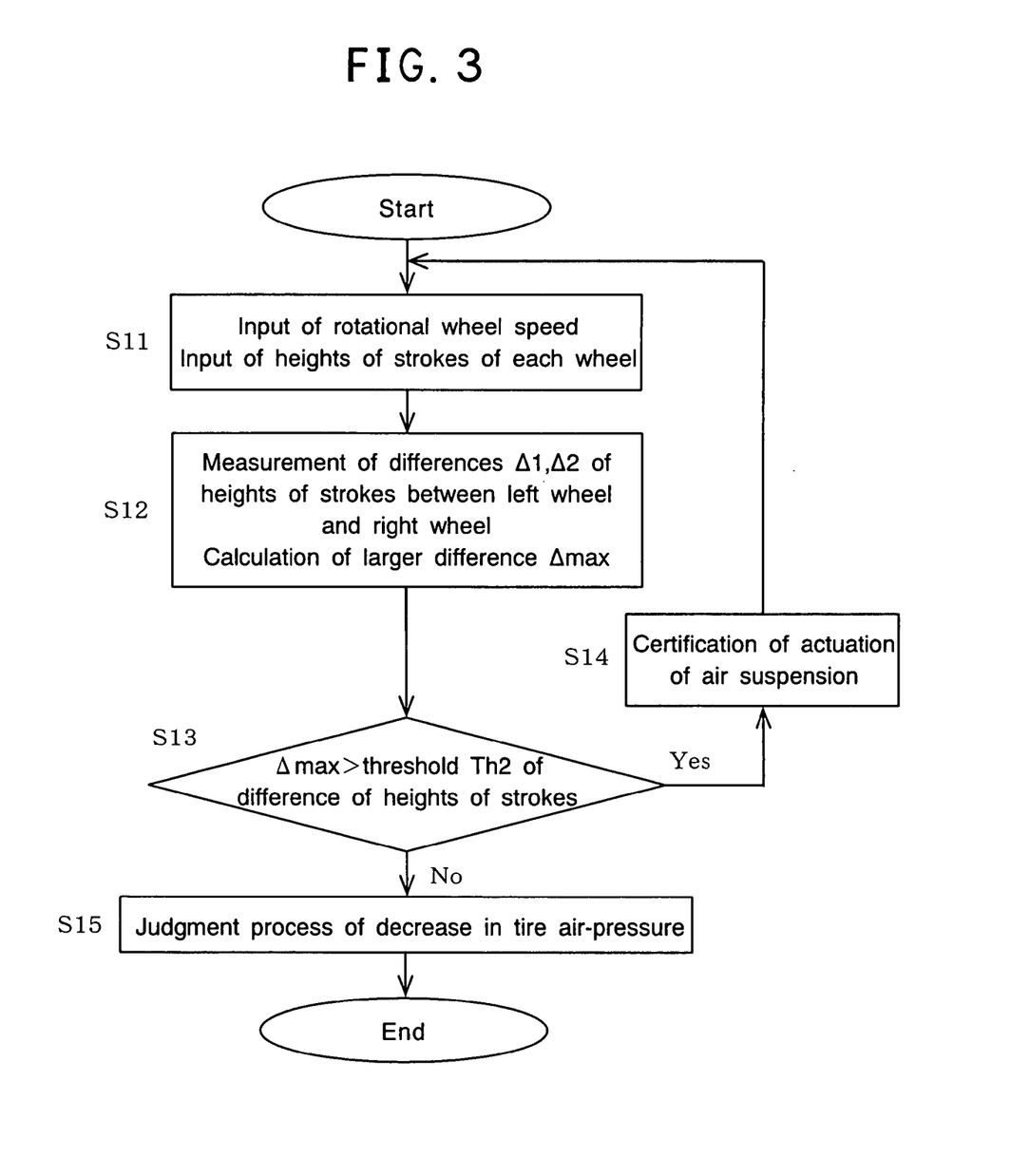
FIG. 3 is an example of a flowchart related to the first mode of the present invention.

When air suspensions are actuated, the rotational speed of a tire applied with heavier load increases, but since this is not based on decrease in tire air-pressure, the data cannot be used for judgment for decrease in tire air-pressure as they are. When the air suspensions are actuated as shown in FIG. 3, the difference of the heights of strokes between left wheel and right wheel is generated; therefore when the difference is detected, it can be specified whether the air suspensions cause the speed up of the rotational speed of a tire, or not (Step S11-13). For example, when the difference of the heights of strokes between left wheel and right wheel of either front wheel or rear wheel exceeds threshold Th 2, it can be certified that the cause that the rotational speed of a tire of one wheel increases is the actuation of an air suspension (Step S13-14). The specific example of a judgment equation includes the under-mentioned equation (2) and (3).

$$|\text{Height of stroke at front left wheel} - \text{Height of stroke at front right wheel}| > Th2 \quad (2)$$

$$|\text{Height of stroke at rear left wheel} - \text{Height of stroke at rear right wheel}| > Th2 \quad (3)$$

In the equation (2) and (3), for example, Th 2 is 20 mm, but is preferably changed depending on running environment, the kind of a vehicle and a tire size.

When it is judged in Step A that the cause that the rotational speed of a tire of one wheel increases is the fluctuation of an air suspension by influence of the air suspension, the judgment of decrease in tire air-pressure is not carried out (Step S13-14). The judgment of decrease in tire air-pressure is carried out in case that neither the above-mentioned equation (2) nor (3) are satisfied (Step S13, 15).

As the method for judging decrease in tire air-pressure, for example, there can be used known means such as a method of utilizing that the rotational wheel speed of only one wheel increases because the dynamic load radius of a tire decreased in air-pressure is lessened in comparison with that of a tire with normal air-pressure, and it is not specifically limited.

Thus, the judgment of decrease in tire air-pressure can be precisely carried out by applying those capable of precisely judging decrease in tire air-pressure, even if the air suspensions are actuated, loads applied on respective tires are changed by the influence of air suspensions and the rotational speed of a tire of one wheel increases.

The method for alarming abnormality in tire air-pressure in the second mode of the present invention includes a step (hereinafter, referred to as Step B) of judging whether loads applied on respective tires are changed by the influence of air suspensions based on the difference of the heights of strokes between left wheel and right wheel in the vehicle equipped with air suspensions and affect the rotational wheel speeds of tires or not, and increasing threshold for carrying out the judgment of decrease in tire air-pressure when the air suspensions provide influence.

Figure 4:
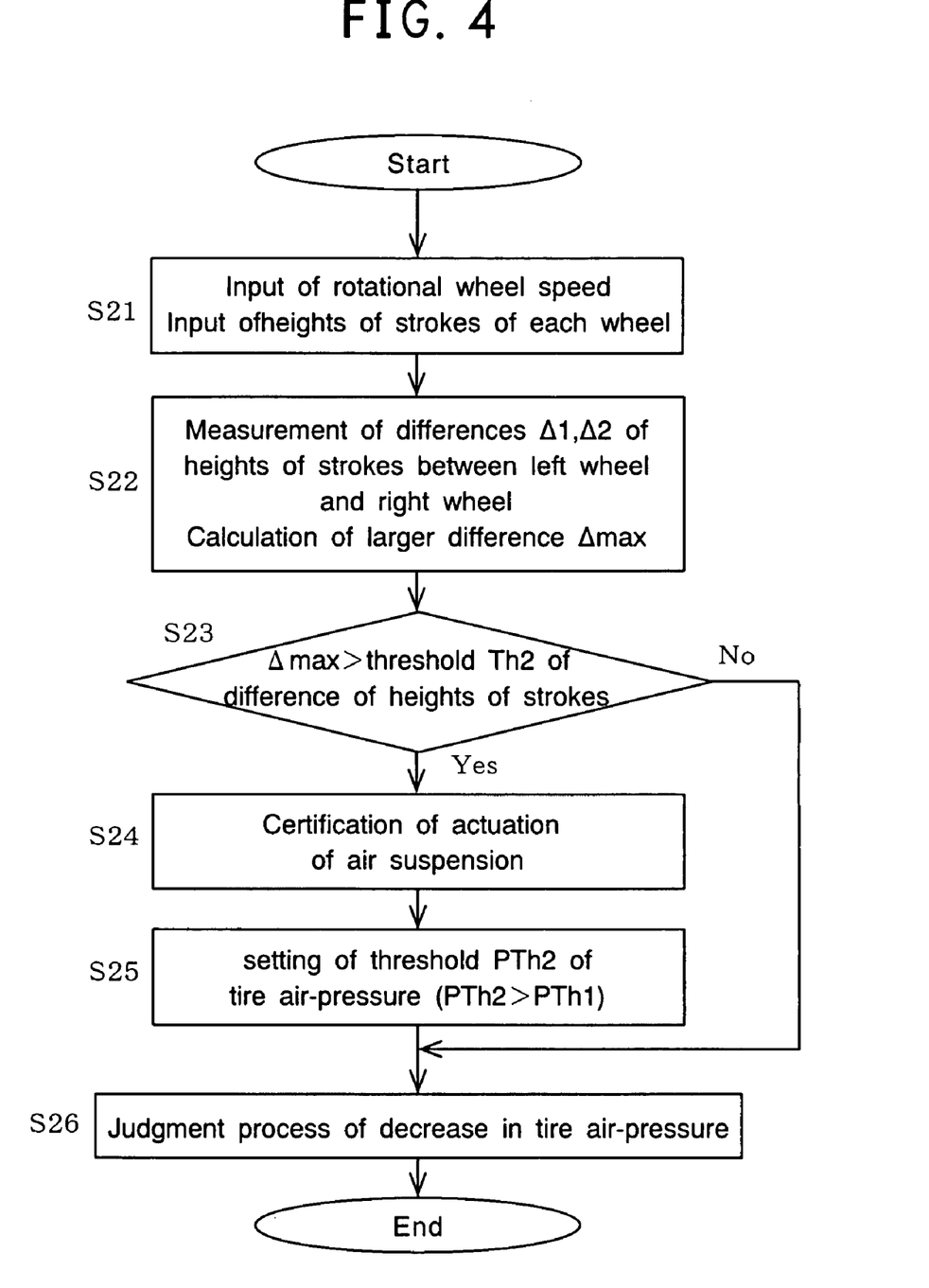
FIG. 4 is an example of a flowchart related to the second mode of the present invention.

The judgment whether the air suspensions affect the rotational wheel speeds of tires, or not can be conducted by a similar method as illustrated in the first mode of the present invention. Further, when the difference of the heights of strokes between left wheel and right wheel of either front wheel or rear wheel exceeds the threshold Th 2 as shown in FIG. 4, it is certified in like manner as Step A that the cause that the rotational speed of a tire of one wheel increases is the actuation of an air suspension (Step S23). Further, hereat, the threshold Th 2 is not limited to the same value as the threshold Th 2 in Step A, it is occasionally set as a different value and it is preferably changed depending on running environment, the kind of a vehicle and a tire size.

At Step B, when the difference of the heights of strokes between left wheel and right wheel of either front wheel or rear wheel is larger than the thresholds Th 2, the threshold for the judgment of decrease in tire air-pressure is increased. When the air suspensions are actuated, the rotational speed of a tire applied with heavier load increases, therefore the judgment value for carrying out the judgment of decrease in tire air-pressure is increased in comparison with no actuation of the air suspensions. Accordingly, when it is judged that the air suspensions are actuated, the threshold for carrying out the judgment of decrease in tire air-pressure is increased from PTh 1 to PTh 2 (PTh 2>PTh 1). When the air suspensions affect the rotational wheel speeds of tires, the increase of the rotational speed caused by the decrease in tire air-pressure can be more precisely judged by setting it so as not to exceed the threshold for carrying out the judgment of decrease in tire air-pressure (Step S23-25). Specifically, methods such as a method of setting the threshold for carrying out the judgment of decrease in tire air-pressure as 1.3-fold are mentioned. 1.3-Fold is merely one example and it is preferably changed depending on running environment, the kind of a vehicle and a tire size.

At Step B, when it is judged that the cause that the rotational speed of a tire of one wheel increases is the fluctuation by an air suspension affected by the air suspension, the threshold for carrying out the judgment of decrease in tire air-pressure is increased and the judgment of decrease in tire air-pressure is carried out (Step S23-26). Further, in case that neither the above-mentioned equation (2) nor (3) are satisfied, the threshold for the judgment of decrease in tire air-pressure is not increased and the judgment of decrease in tire air-pressure is carried out (Step S23, 26).

The method of judging decrease in tire air-pressure is not specifically limited and can be similar as the first mode of the invention.

Thus, data by which decrease in tire air-pressure can be precisely judged are used as they are, the threshold for decrease in tire air-pressure is increased for data by which decrease in tire air-pressure can be not precisely judged are used, and thereby, decrease in tire air-pressure can be precisely judged even if the air suspensions are actuated, loads applied on respective tires are changed by the influence of air suspensions and the rotational speed of a tire of one wheel increases (Step S23-26).

The method for alarming abnormality in tire air-pressure in the third mode of the present invention includes a step (hereinafter, referred to as Step C) of judging whether loads applied on respective tires are changed by the influence of air suspensions based on the difference of the heights of strokes between left wheel and right wheel in a vehicle equipped with air suspensions and affect the rotational wheel speeds of tires or not, and correcting a judgment value for carrying out the judgment of decrease in tire air-pressure when the air suspensions provide influence.

Figure 5:
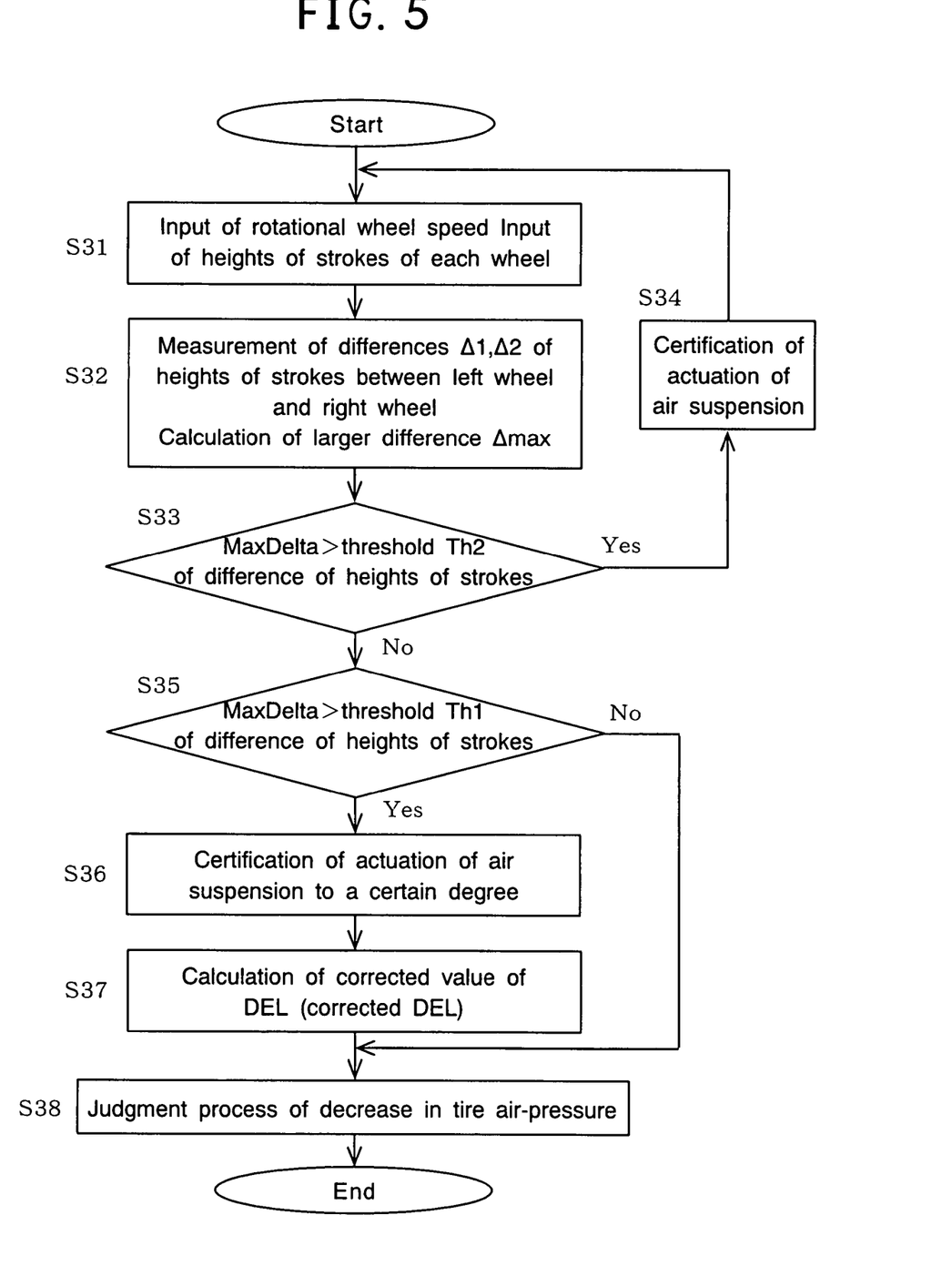
FIG. 5 is an example of a flowchart related to the third mode of the present invention.

At Step C, firstly, |Height of stroke at front left wheel−Height of stroke at front right wheel| is compared with |Height of stroke at rear left wheel−Height of stroke at rear right wheel| and the larger value (hereinafter, referred to as MaxDelta) is adopted as shown in FIG. 5.

When the MaxDelta is larger than the threshold Th 2 (for example, 20 mm), it can be certified in like manner as Step A that the cause that the rotational speed of a tire of one wheel increases is the actuation of an air suspension (Step S33-34).

Further, when the MaxDelta is smaller than the threshold Th 1 (for example, 10 mm), influence by the air suspension is little, and it can be certified that the cause that the rotational speed of a tire of one wheel increases is not fluctuation by an air suspension (Step S35, 38).

Hereat, the thresholds Th 1 and Th 2 are not limited to the same values as the thresholds Th 1 and Th 2 in Step A or B, they may be occasionally set at different values, and it is preferably changed depending on running environment, the kind of a vehicle and a tire size.

Finally, when the MaxDelta is within the range of the threshold Th 1 to Th 2, the cause that the rotational speed of a tire of one wheel increases is both cases of a case of fluctuation by an air suspension affected by the air suspension and a case of being not so; therefore the increase of rotational speed caused by decrease in tire air-pressure can be more precisely judged by correcting a judgment value for carrying out the judgment of decrease in tire air-pressure (Step S33-37).

Figure 6:
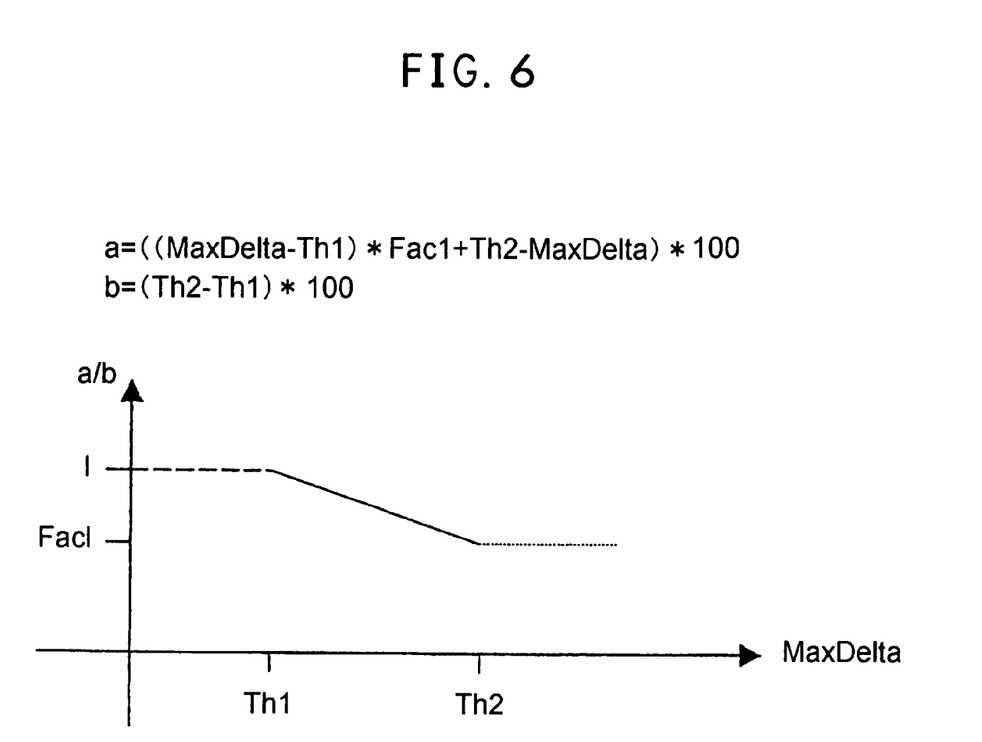
FIG. 6 is an example of a correction method for judging decrease in tire air-pressure related to the third mode of the present invention.

As the means for correcting a judgment value for carrying out the judgment of decrease in tire air-pressure, specifically, methods such as a method of correcting the judgment value using the equation (4) is mentioned.

$$\text{(Judgement value after correction)} = \qquad (4)$$
$$\text{(Judgement value before correction)} \times (a/b)$$
$$a = ((\text{MaxDelta} - Th1) \times Fac1 + Th2 - \text{MaxDelta})$$
$$b = (Th2 - Th1) \times 100$$

In the equation (4), Fac 1 is dependent on the correction quantity of the maximum judgment value (when MaxDelta is Th 2), and for example, is $10/256$, but it is only one example and it is preferably changed depending on running environment, the kind of a vehicle and a tire size.

In Step C, when it is judged that the cause that the rotational speed of a tire of one wheel increases is affected by an air suspension and is the fluctuation by the air suspension, the judgment of decrease in tire air-pressure is not carried out (Step S33-34). Further, when it is judged that the cause that the rotational speed of a tire of one wheel increases is not affected by an air suspension and is not fluctuation by the air suspension, the judgment of decrease in tire air-pressure is carried out (Step S35, 38). Further, when it is not clear whether the cause that the rotational speed of a tire of one wheel increased is affected by an air suspension and is the fluctuation by the air suspension, or not, a judgment value for carrying out the judgment of decrease in tire air-pressure is corrected and the judgment of decrease in tire air-pressure is carried out (Step S35-38).

The method for judging decrease in tire air-pressure is not specifically limited and can be similar as the first embodiment of the present invention.

Thus, data by which decrease in tire air-pressure can be precisely judged are used as they are and data by which decrease in tire air-pressure cannot be precisely judged are not applied. Further, by correcting a judgment value for carrying out the judgment of decrease in tire air-pressure with respect to data by which it is not clear whether decrease in tire air-pressure can be precisely judged or not, and thereby, decrease in tire air-pressure can be precisely judged even if the air suspensions are actuated, loads applied on respective tires are changed by the influence of air suspensions and the rotational speed of a tire of one wheel increases.

The method for alarming abnormality in tire air-pressure of the present invention was illustrated above, but the apparatus for alarming abnormality in tire air-pressure of the present invention and the program for alarming abnormality in tire air-pressure of the present invention are also similar.

Example

Then, the present invention is specifically illustrated based on Example, but the present invention is not limited only to these.

Tires with a size of 225/50R17 were mounted on all of 4 wheels of a two-seated FR vehicle for test. At this time, air suspensions were mounted on both of a front shaft and a rear shaft.

The fore-mentioned FR vehicle ran on a test course with a long straight line for 30 seconds and MaxDelta was measured during the test to calculate a judgment value before correction and a judgment value after correction.

Hereat, the judgment value before correction was calculated using the equation (5).

$$DEL=((FL+FR)/2-(FR+RL)/2)\div((FL+FR+RL+RR)/4)\times 100 \quad (5)$$

Figure 7:
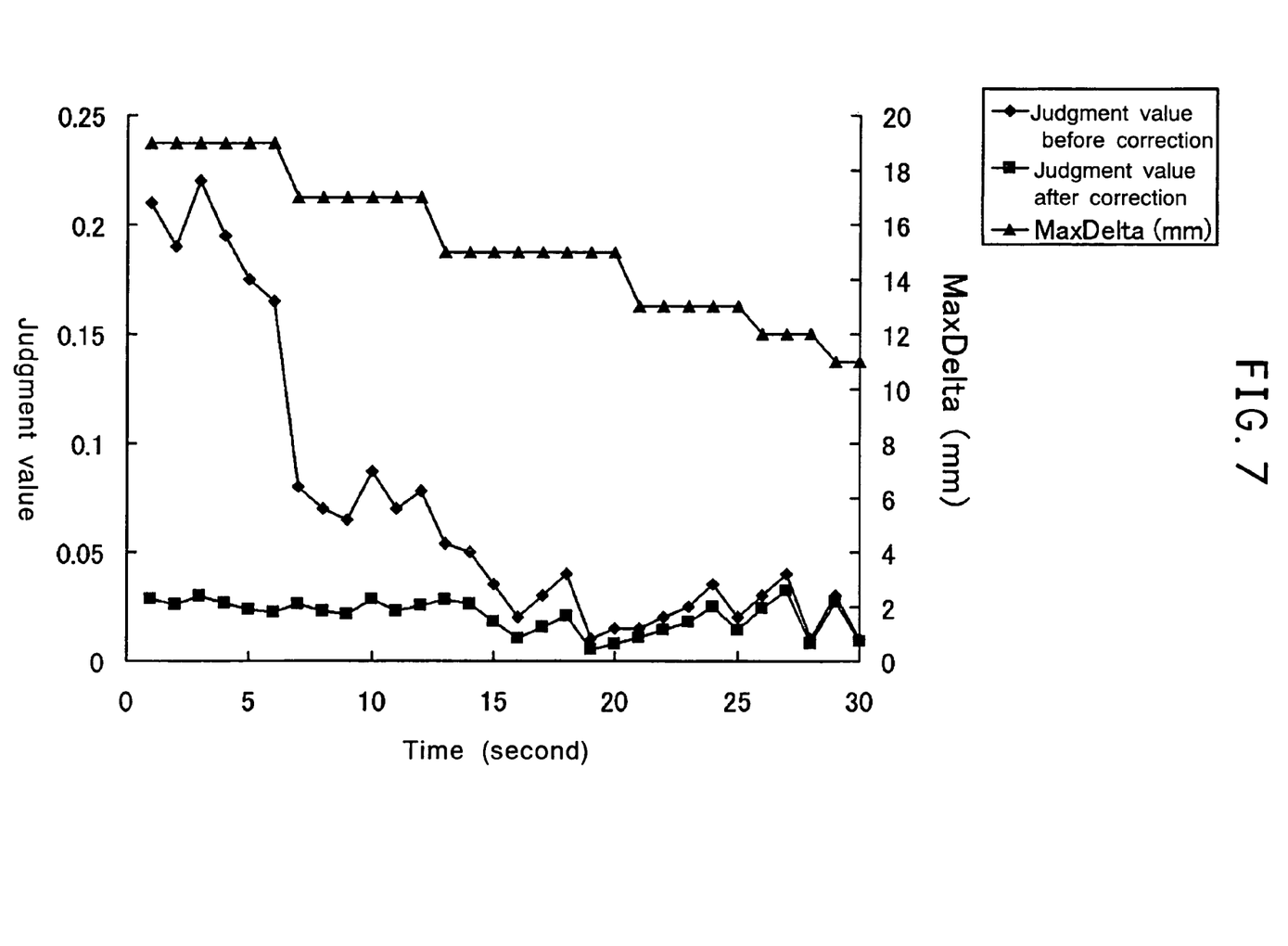
FIG. 7 is a graph comparing the measurement result of a case of correcting a judgment value with that of a case of no correction in a vehicle equipped with air suspensions, in the method for alarming abnormality in tire air-pressure related to Example of the present invention.

FIG. 7 is a graph comparing the measurement result of a case of correcting a judgment value with that of a case of no correction in a vehicle equipped with air suspensions, in the method for alarming in tire air-pressure related to Example of the present invention, and showing a judgment value was lower than 0.1 when it was corrected.

When the judgment value is about 0.1, it is usually judged that the air pressure of a tire is decreased. Namely, when the judgment value was not corrected in a vehicle equipped with air suspensions, it was found that it was judged (erroneous report) for 6 seconds from the start of experiment that the air pressure of tires was decreased.

On the other hand, when the judgment value was corrected, it was found that judgment value was not enlarged but erroneous report could be prevented.

What is claimed is:

1. A method for alarming abnormality in tire air-pressure informing decrease in tire air-pressure mounted on a vehicle, comprising a step of judging whether loads applied on respective tires are changed by the influence of air suspensions based on the difference of the heights of strokes between left wheel and right wheel in the vehicle equipped with the air suspensions and affect the rotational wheel speeds of tires or not, and not carrying out the judgment of decrease in tire air-pressure when the air suspensions provide influence.

2. A method for alarming abnormality in tire air-pressure informing decrease in tire air-pressure mounted on a vehicle, comprising a step of judging whether loads applied on respective tires are changed by the influence of air suspensions based on the difference of the heights of strokes between left wheel and right wheel in the vehicle equipped with the air suspensions and affect the rotational wheel speeds of tires or not, and increasing threshold for carrying out the judgment of decrease in tire air-pressure when the air suspensions provide influence.

3. A method for alarming abnormality in tire air-pressure informing decrease in tire air-pressure mounted on a vehicle, comprising a step of judging whether loads applied on respective tires are changed by the influence of air suspensions based on the difference of the heights of strokes between left wheel and right wheel in a vehicle equipped with the air suspensions and affect the rotational wheel speeds of tires or not, and correcting a judgment value for carrying out the judgment of decrease in tire air-pressure when the air suspensions provide influence.

4. An apparatus for alarming abnormality in tire air-pressure informing decrease in tire air-pressure mounted on a vehicle, comprising means of judging whether loads applied on respective tires are changed by the influence of air suspensions based on the difference of the heights of strokes between left wheel and right wheel in the vehicle equipped with the air suspensions and affect the rotational wheel speeds of tires or not, and not carrying out the judgment of decrease in tire air-pressure when the air suspensions provide influence.

5. An apparatus for alarming abnormality in tire air-pressure informing decrease in tire air-pressure mounted on a vehicle, comprising means of judging whether loads applied on respective tires are changed by the influence of air suspensions based on the difference of the heights of strokes between left wheel and right wheel in the vehicle equipped with the air suspensions and affect the rotational wheel speeds of tires or not, and increasing threshold for carrying out the judgment of decrease in tire air-pressure when the air suspensions provide influence.

6. An apparatus for alarming abnormality in tire air-pressure informing decrease in tire air-pressure mounted on a vehicle, comprising means of judging whether loads applied on respective tires are changed by the influence of air suspensions based on the difference of the heights of strokes between left wheel and right wheel in a vehicle equipped with the air suspensions and affect the rotational wheel speeds of tires or not, and correcting a judgment value for carrying out the judgment of decrease in tire air-pressure when the air suspensions provide influence.

7. A non-transitory computer-readable medium containing a computer program product comprising computer-executable instructions for alarming abnormality in tire air-pressure informing decrease in tire air-pressure mounted on a vehicle, for making a computer execute a procedure of judging whether loads applied on respective tires are changed by the influence of air suspensions based on the difference of the heights of strokes between left wheel and right wheel in the vehicle equipped with the air suspensions and affect the rotational wheel speeds of tires or not, and not carrying out the judgment of decrease in tire air-pressure when the air suspensions provide influence.

8. A non-transitory computer-readable medium containing a computer program product comprising computer-executable instructions for alarming abnormality in tire air-pressure informing decrease in tire air-pressure mounted on a vehicle, for making a computer execute a procedure of judging whether loads applied on respective tires are changed by the influence of air suspensions based on the difference of the heights of strokes between left wheel and right wheel in the vehicle equipped with the air suspensions and affect the rotational wheel speeds of tires or not, and increasing threshold for carrying out the judgment of decrease in tire air-pressure when the air suspensions provide influence.

9. A non-transitory computer-readable medium containing a computer program product comprising computer-executable instructions for alarming abnormality in tire air-pressure informing decrease in tire air-pressure mounted on a vehicle, for making a computer execute a procedure of judging whether loads applied on respective tires are changed by the influence of air suspensions based on the difference of the heights of strokes between left wheel and right wheel in a vehicle equipped with the air suspensions and affect the rotational wheel speeds of tires or not, and correcting a judgment value for carrying out the judgment of decrease in tire air-pressure when the air suspensions provide influence.

* * * * *